United States Patent [19]

Gerber

[11] 4,055,534
[45] Oct. 25, 1977

[54] UPGRADED AROMATIC POLYESTER MATERIAL IN POWDER FORM

[75] Inventor: Arthur H. Gerber, University Hts., Ohio

[73] Assignee: Horizons Incorporated, a division of Horizons Research Incorporated, Cleveland, Ohio

[21] Appl. No.: 631,996

[22] Filed: Nov. 14, 1975

[51] Int. Cl.² .................... C08G 18/08; C08G 18/82; C08K 5/52; C08G 18/42

[52] U.S. Cl. .................... 260/45.7 PH; 260/2.3; 260/30.2; 260/30.6 R; 260/30.8 DS; 260/30.8 R; 260/31.8 DB; 260/31.8 P; 260/31.8 R; 260/32.6 N; 260/32.8 N; 260/33.6 UB; 260/37 N; 260/45.7 P; 260/45.75; 260/45.95 H; 260/75 NE; 260/75 NH; 260/75 NP; 260/77.5 CR; 260/77.5 SS

[58] Field of Search ........ 260/75 NH, 75 NE, 75 NP, 260/77.5 SP, 77.5 SS, 45.7 P

[56] References Cited

U.S. PATENT DOCUMENTS

| | | | |
|---|---|---|---|
| 2,981,712 | 4/1961 | Harper | 260/75 NP |
| 3,142,650 | 7/1964 | Friedman | 260/77.5 SS |
| 3,344,121 | 9/1967 | Phelisse et al. | 260/77.5 SP |
| 3,377,308 | 4/1968 | Oertel et al. | 260/77.5 SP |
| 3,386,942 | 6/1968 | Bell et al. | 260/77.5 SP |
| 3,573,251 | 3/1971 | Megna et al. | 260/77.5 SS |
| 3,642,703 | 2/1972 | Suzuki et al. | 260/77.5 SP |
| 3,668,173 | 6/1972 | Wooster et al. | 260/77.5 SP |

*Primary Examiner*—H.S. Cockeram
*Attorney, Agent, or Firm*—Lawrence I. Field

[57] ABSTRACT

A process for upgrading polyesters derived from aromatic dicarboxylic acids which comprises reaction of the polyester material (both virgin and scrap) in an aprotic polar solvent with any of the following:

a. diisocyanates represented by the general formula R(NCO)₂ with difunctional reagents in which the functionality is selected from —OH, —NH and/or —COOH; and, b. isocyanate terminated polymers alone or with the above difunctional reagents.

The invention also includes stabilization of the products obtained from the above, with organic phosphites.

The polyester products, whether or not stabilized, are found to be upgraded with respect to both molecular weight and processability as compared with the starting material and are readily recoverable in powder form which is most desirable for subsequent use.

16 Claims, No Drawings

UPGRADED AROMATIC POLYESTER MATERIAL IN POWDER FORM

A variety of processes for recovering polyester from scrap materials are known but many such processes in which the polyester is degraded do not yield a material suitable for molding to useful product.

This invention relates to a process for upgrading linear polyesters and subsequently effecting isolation of the upgraded polyester material in powder form. It is applicable to virgin as well as reprocessed or reclaimed polyesters and is applicable to the scrap produced from millions of pounds of polyesters produced annually. Scrap which may be processed in accordance with the present invention includes that in the form of film, fiber, pellets, and molded parts, as well as in powder form.

Polyester in powder form is desired for many purposes. Processes in which the polymer is physically comminuted in order to obtain a finely divided resin are relatively expensive.

One object of the invention is to provide a useful polyester product in high yield in which the molecular weight of the polyester product is upgraded, as compared to the starting material.

Another object of this invention is to provide said upgraded polyester compositions in powder form, suitable for extrusion, molding and various thermoforming processes.

Polyesters such poly(ethylene terephthalate) and poly(1,4-butylene terephthalate) are highly crystalline solids melting at about 265° and 240° C, respectively, and are therefore difficult to process. Furthermore, poly(ethylene terephthalate) possesses limited impact resistance. Since it is difficult to plasticize these polymers, improvements in impact properties, without major sacrifice in other physical properties has not been obtained. Low molecular weight poly(ethylene terephthalate) is easier to process than higher molecular weight material but is not suitable as an engineering grade thermoplastic. For example, powdered polymer with a relative viscosity of 1.5 (m-cresol, 31° C, 1g/100 ml) cannot be easily thermoformed into film with good tensile and elongation properties. The molecular weight of such material can be increased by heating at 230°–240° C as described in U.S. Pat. Nos. 3,767,601 issued Oct. 23, 1973 and 3,804,911 issued Apr. 16, 1974, but this does not significantly improve impact properties or melting point and therefore the resulting polymer is still difficult to process.

It has been found that molecular weight upgrading and improved processability can be simultaneously achieved by reaction of the polyester, in solution, with a diisocyanate and a difunctional reagent or with an isocyanate terminated adduct derived by reaction of the two with or without another difunctional reagent, wherein the functionality is chosen from hydroxyl, COOH, and $NHR_4$, where $R_4$ is alkyl of 1–5 carbon atoms, phenyl or benzyl. The preferred functionality is hydroxyl. The diisocyanates or difunctional reagents can be of low molecular weight or they can be polymeric. More than one diisocyanate and more than one difunctional reagent can be utilized. In order to satisfactorily upgrade molecular weight and avoid formation of crosslinks, the total equivalents of isocyanate groups should be approximately equal to the total number of —OH, —$NHR_4$ and —COOH end groups present in the polyester(s) being processed and in any difunctional reagents with which the polyester(s) is being reacted.

This is important since many physical properties are improved by increasing the molecular weight of the polyester and by depressing its melting point. The polyester products of this invention are easier to process and show improved impact resistance as compared with the materials from which they were obtained.

Polyesters that are suitable for the practice of this invention are largely or wholly derived from at least one aromatic dibasic acid or lower alkyl esters thereof and at least one glycol. Polyesters that are also suitable may be derived from materials which contain both hydroxyl and carboxylic acid functions in the same molecule such as p-($\beta$-hydroxyethyloxy)benzoic acid. Molecular weights of the polyesters will vary from about 10,000 to 50,000. Suitable polyesters are largely, if not exclusively terminated by hydroxyl or carboxylic acid functionality. When engineering grade thermoplastic is desired the starting polyester for the practice of this invention should have an approximate melting point of 200° C. or greater. Lower melting polyesters are employed when elastoplastic materials are desired.

Representative examples of dicarboxylic acids from which the polyesters are derived are terephthalic acid, isophthalic acid, p,p'-diphenyldicarboxylic acid, 2,6-naphthalenedicarboxylic acid, p,p'-benzophenonedicarboxylic acid, 2,2'-bis(p-carboxyphenyl) propane, and the like. Chlorinated and brominated acid derivatives are likewise suitable, particularly for flame retardant applications. Representative glycols used in the preparation of said polyesters are ethylene glycol, propylene glycol, tetramethylene glycol, neopentyl glycol, 1,4-dimethanol cyclohexane, diethylene glycol, bis(hydroxyethyl) sulfide, hexamethylene glycol, decamethylene glycol and the like. The polyesters suitable for the practice of this invention are generally prepared by melt polymerization condensation processes such as those described in U.S. Pat. No. 3,254,055 issued May 31, 1966. Polyesters derived from terephthalic acid are generally preferred because of their low cost and ready availability in scrap form.

Specific representative polyesters that may be employed singly or in combination for the practice of the invention are:
poly(ethylene terephthalate)
poly(1,4-butylene terephthalate)
poly(1,4-butylene 2,6-naphthalenedicarboxylate)
poly(1,4-butylene-poly(tetramethylene ether) terephthalate) (copolymers)
poly(ethylene terephthalate-2,6-naphthalenedicarboxylate) (copolymers)
poly(1,4-cyclohexane dimethylene isophthalate-coterephthalate) (50/50)
poly(hexamethylene 4,4'-dibenzoate)
poly(ethylene 1,2-ethylenedioxy-4,4'-dibenzoate)
poly(hexamethylene carbonyl-4,4'dibenzoate)
poly(ethylene oxybenzoate)

Suitable diisocyanates with which the above polyesters may be reacted in accordance with this invention include:
m-phenylene diisocyanate
p-phenylene diisocyanate
4,4'-diphenylmethane diisocyanate
2,4-tolylene diisocyanate
2,4-/2,6-tolylene diisocyanate (60:40)
1-chloro-2,4-phenylene diisocyanate
1,5-naphthalene diisocyanate 3,3'-dimethyl-4,4'-biphenylene diisocyanate
3,3'-dimethyl-4,4'-diphenylmethane diisocyanate
3,3'-dimethoxy-4,4'-biphenylene diisocyanate
4,4'-diisocyanato-1,1'-bicyclohexyl
m,p-xylylene diisocyanate
4,4'-dicyclohexylmethane diisocyanate
dimeryl diisocyanate ($C_{36}$ derivative)
isophorone diisocyanate
1,6-hexamethylene diisocyanate
1,10-decamethylene diisocyanate
2,2,4-trimethylhexamethylene diisocyanate
bis(2-isocyanato-ethyl) fumarate
bis(2-isocyanato-ethyl)carbonate Of the above diisocyanates, the 4,4'-dicyclohexylmethane, isophorone, and 4,4'-diphenylmethane diisocyanates are preferred.

Suitable difunctional reagents for the practice of this invention are:

1. The glycols noted above from which the polyesters are prepared and 1,4-butenediol, poly(oxy-1,2-propylene) glycol, poly(oxyethylene) glycol, poly(oxyethylene-b-oxypropylene) glycol (block copolymer), poly(oxy-1,3-propylene) glycol, poly(oxy-tetramethylene) glycol, glycol polymers derived from 1,2-epoxides such as cyclohexene oxide, phenyl glycidyl ether, epichlorohydrin, and cyanoalkyl glycidyl ether, hydroxyl terminated polybutadiene and polybutadiene copolymers with acrylonitrile or styrene, hydroxyl terminated polystyrene, and hydroxyl terminated polyesters such as poly(ethylene adipate), poly(ethylene-propylene adipate) (copolymers), poly(butylene adipate-isophthalate) (copolymers), poly(ethylene sebacate), poly(1,4-cyclohexane adipate), poly(1,4-cyclohexene dimethylene succinate), poly(p-xylylene azealate). In addition, hydroxyl terminated polyesters derived from lactones such as poly(δ-valero-lactone), poly(ε-caprolactone) and poly(pivalalactone) are also suitable.

Hydroxyalkyl ($C_2$-$C_6$) terminated polycarbonates such as poly(2,2-propane bis-4-phenyl carbonate), poly(hexamethylene carbonate), and poly(neopentylene carbonate) are suitable, and hydroxyalkyl terminated aromatic polyesters, that is those derived from a diphenolic compound, e.g. poly(m-phenylene isophthalate), poly(4,4'-thiodiphenylene isophthalate), poly(2,2-propane bis(4-phenyl isophthalate-co-terephthalate) (50/50), poly(p-phenylene adipate), and poly(p-phenylene phenyl phosphonate) are also suitable.

2. Aliphatic and aromatic diamines such as 1,6-hexanediamine, 1,10-decanediamine, 1,12-decanediamine, m- and p-phenylenediamine, piperazine, 2,5-dimethylpiperazine, 4,4'-diaminodiphenylmethane, as well as amine terminated polyamides such as poly(hexamethylene sebacamide), poly(octamethylene adipamide), poly(dodecamethylene sebacamide), poly(N,N'-isophthaloyl-2,5-dimethylpiperazine), poly(m-phenylene suberamide), poly(4,4'-diphenylmethylene adipamide), poly(1,4-cyclohexylene suberamide), poly(p-phenylene phthalamide), and poly(N,N'-diethylethylene terephthalamide) are suitable.

3. Reagents that contain dissimilar reactive end groups selected from —OH, —$NHR_4$ or —COOH are likewise suitable and may be selected from low molecular weight or polymeric materials. Representative examples of such materials are ethanolamine and N-methyl, N-ethyl, N-benzyl or N-phenyl ethanolamine, 4-amino propanol, amino acids such as 3- or 4-aminobenzoic acids, p-aminophenylacetic acid, omega amino-alkanoic acids of 2 to 12 carbon atoms, amine and carboxylic acid terminated polyamides such as those derived from omega amino-alkanoic acids of 4 to 12 carbon atoms, 2-(p-aminophenyl) ethanol, 2(p-carboxyphenyl) ethanol, omega hydroxy-alkanoic acids of 2 to 12 carbon atoms, hydroxyl and carboxylic acid terminated polyesters such as poly(δ-valerolactone), poly(ε-caprolactone), poly(11-oxyundecanoyl) and poly(glycollic ester).

4. Aliphatic and aromatic dicarboxylic acids such as azelaic acid, sebacic acid, 1,11-undecanedicarboxylic acid, dimer acid ($C_{36}$ diacid, General Mills Company), 1,5-cyclooctadiene-1,5-dicarboxylic acid, terephthalic acid, isophthalic acid 2,6-naphthalenedicarboxylic acid, p,p'-diphenyldicarboxylic acid, bis(carboxymethyl)sulfide, bis(carbomethyl)ether, 1,3- or 1,4-cyclohexanedicarboxylic acid, fumaric acid, 5-cyanoisophthalic acid, 4,4'-stilbene dicarboxylic acid, and the like. When acid reagents are employed it is generally preferable to use aliphatic diisocyanate coreactants such as hexamethylene diisocyanate and 4,4'-dicyclohexylmethane diisocyanate.

Carboxyl terminated polymers such as those derived from olefins, diolefins, and mixtures thereof, may also be employed. Representative examples are carboxy terminated polybutadiene, polystyrene, poly(butadiene-acrylonitrile), poly(butadiene-styrene) and polysiloxanes such as poly(dimethyl siloxane), poly(diphenyl siloxane), poly(methylphenyl siloxane). The polybutadienes and copolymers thereof can vary greatly in microstructure and can consist predominately of 1,2;cis-1,4-; or tran-1,4 units.

Functionally mixed polymers such as poly(ester-amides), poly(ester-carbonates), poly(ester-urethanes), poly(carbonate-urethanes), poly(butadiene-caprolactam), poly(styrene-caprolactam) that are terminated with hydroxyl, amine or carboxylic acid groups are also suitable for the practice of this invention. These mixed polymers may be ordered, block or random in structure.

Isocyanate terminated polymers which are derived from an aforementioned diisocyanate and dihydroxy or diamino reagent are also useful in the practice of this invention. Isocyanate terminated polymers derived from carboxy terminated polymers such as carboxy terminated polybutadiene or polyisoprene, carboxy terminated polystyrene or poly α-methyl styrene, and carboxy terminated polybutadiene copolymers with either acrylonitrile or styrene may also be employed. These isocyanate terminated polymers are prepared by reacting at least 2 equivalents of diisocyanate with 1 equivalent of difunctional polymer. Isocyanate terminated polymers such as poly(butadiene-caprolactam), prepared from anionic polymerization with subsequent reaction with diisocyanate, are also suitable.

The amount of diisocyanate used for the practice of this invention depends on the equivalents of reactive terminal hydrogen sites present both on the polyester and difunctional reagent. Amounts of difunctional reagent which can be employed can vary greatly, that is from 1 up to 50 percent by weight on polyester. Higher amounts can be used but the cost generally becomes prohibitive. Difunctional reagents of molecular weight of several hundred or less are preferably employed in amounts of 1 to 5 percent, whereas polymeric reagents with molecular weights of about 1 to 10,000 can be employed in amounts of 5 to 50 percent, but are generally used in amounts of 5 to 25 percent to best compromise cost with physical properties improvement.

The process of this invention will now be described. Polyester in the form of powder, film, fiber, pellets, molded parts is suitable. With the exception of powder, the polyester is chopped or cut to a size that can be charged to a reactor and subsequently stirred. Insoluble impurities such as pigments, stabilizers, and the like which may be present in the polyester are removed by filtration of polyester solution at elevated temperatures prior to reaction with diisocyanate and difunctional reagent. Furthermore, the hot polymer solution may be treated with a solid adsorbent such as charcoal to remove undesirable color or other such contamination. Solvents that have boiling points equal to or greater than the temperature necessary to dissolve and react the polyester at atmospheric pressure are suitable. Representative solvents that are suitable are polar aprotic organic solvents selected from the group sulfolane(tetramethylenesulfone), 3-methylsulfolane, N-methylpyrrolidinone, N-benzylpyrrolidinone, nitrobenzene, nitrotoluene, dimethylsulfoxide, diethylsulfoxide, hexamethylphosphoramide, and mixtures thereof. Sulfolane and N-methylpyrrolidinone are preferred because they are relatively inexpensive and are miscible with water therefore permitting subsequent water washing in the isolation of purified product. Of the water immiscible solvents nitrobenzene is preferred. The solvent(s) can be readily recovered and purified by distillation if necessary, and subsequently reused. Other solvents such as halogenated and alkylated benzenes and aromatic ethers may be used in conjunction with the aforementioned polar aprotic solvents. The reaction is carried out at atmospheric pressure at a temperature at which the polyester is soluble, namely at least 100° C and preferably between 130° and 180° C. The initial concentration of polyester is not critical but is generally in the range of 10 to 30 percent. Three general procedures have been found to be suitable: (1) a prereacted solution of diisocyanate(s) and difunctional regents(s) is added to the hot polyester solution, (2) the predried polyester is added to solvent containing difunctional reagent(s) then diisocyanate added, and (3) the polyester is prereacted in solution with difunctional reagent(s) until the relative viscosity of polymer (obtained by isolation of a small sample, washing, drying, etc.) has dropped slightly or shows little change with time, then diisocyanate(s) is added. The prereaction time in method (3) can vary from about one-half hour to 4 hours and is carried out at temperatures of 110° to 180° C. Amine reagents react rapidly and require short reaction times. Longer times are required for hydroxyl reagents and a transesterification catalyst may be employed to shorten the reaction time. Catalysts used for the preparation of polyester from dimethyl terephthalate, such as zinc acetate, may be employed for this purpose. When method (3) is followed the polyester segments are shortened in molecular weight. Hence ultimate physical properties can be varied not only by the nature and proportions of polyester coreactants but also by the mode of addition utilized. Such physical property manipulation can not be achieved when polyester molecular weight is upgraded solely by use of a low molecular weight diisocyanate.

When more than one difunctional reagent is employed any of the above three procedures can be employed. When one such reagent is polymeric such as a hydroxyl terminated polycarbonate, polyester or polyarylate (polyester derived from a diphenolic component) and the other reagent is a diol or diamine, further manipulation of structure of the final product is possible by reacting the difunctional reagent(s) prior to reaction with the diisocyanate or scrap polyester. For example, a diamine such as 1,6-hexanediamine or 4,4'-methylenedianiline can be reacted with a polycarbonate, polyester or polyarylate reagent. The resulting product is then used as described in the aforementioned procedure.

Various permutations of the above procedures also may be employed. In all cases reactions are preferably conducted under inert atmosphere using dry solvents and reactants. Drying may be effected in the absence of diisocyanate material(s) by azeotropic distillation using benzene or toluene. Upon completion of drying and addition of all reactants, the reaction is completed by heating 1 to 10 hours at temperatures of 120° to 180° C.

When aliphatic, cycloaliphatic, or hindered aromatic diisocyanates or diisocyanate derived adducts are employed it is often desirable to employ a catalyst to facilitate reaction with the polyester and dihydroxy or dicarboxy reagent. Dialkyl tin dicarboxylates such as dibutyl tin diacetate and dibutyl tin dilaurate have been found to be effective but many other catalysts well known to urethane technology may also be used. However, basic catalysts are not generally preferred, particularly with aromatic diisocyanates, because of the possible occurence of undesired side reactions, such as dimerization, trimerization, and allophonation, at elevated temperatures. Catalysts, when used, may be employed in the amount of 0.01 to 0.5 percent by weight on polyester.

The modified polyester product precipitates upon cooling. Non-solvents for the product as well as the solvents employed originally may be added before or during the cooling process while maintaining efficient stirring. In this manner, finely divided product is obtained. the modified polyester product is isolated simply by filtration, washing with simple organic solvents, such as benzene, toluene, methanol, isopropyl alcohol, and/or with water, and dried by methods well known in the art. Excellent yields, often quantitative, are obtained. When the initial polyester has a relative viscosity of about 1.5 (m-cresol, 31° C) the isolated product has a viscosity of at least 1.8 and up to about 3.0. Nevertheless, the products show lower melting points compared to the original polyester and hence can be processed at considerably lower temperatures.

Since the polyester product is recovered as a clean, fine homogenous solid it may be employed, after stabilization and plasticization, when desired, in melt extrusion, molding, and other means of thermoforming commonly utilized in the application of engineering thermoplastics. In contrast, most scrap polyester is either of insufficient molecular weight or too contaminated for use in such processes and when used without upgrading and/or purification affords product with undesirable physical properties.

Other advantages, in addition to physical form and ease of processability, that result from the process and products derived therefrom of this invention are that properties such as impact resistance, elongation, and compatability with plasticizers as well as other polymers are significantly improved. Such properties can be varied greatly by varying the structure and quantities of the materials coreacted with the polyester. This versatility of manipulating structure-property effects in the product of this invention is not attainable when molecular weight of the polyester is upgraded solely by reaction with a low molecular weight diisocyanate in solution or in the solid state as described in U.S. Pat. No.

3,853,821 issued Dec. 10, 1974. The solid state process described in Japan, Kokai, 74 99 741 utilizes poly(butylene terephthalate) for reaction with diisocyanate in the presence of glass fiber, but the polyester is hydroxyl terminated, low in molecular weight and therefore not available as scrap polymer. Following the teachings of U.S. Pat. No. 3,853,821 with the starting materials of this invention without solvents led to no polyester upgrading.

Optimum performance of the products of this invention is obtained by addition of stabilizers. The products of this invention require higher levels of stabilizers than conventional terephthalate based polyesters. Anti-oxidants, free radical and moisture scavengers are useful in this respect. Materials which can simultaneously act as both de-oxidants and moisture scavengers, such as organic phosphites, are particularly useful. Representative phosphites found to be effective stabilizers are triphenyl phosphite, tricresyl phosphite, diphenyl isooctyl phosphite, tri(p-nonylphenyl)phosphite, and polymeric organic aryl phosphites such as those derived by reaction of a triaryl phosphite and an alpha-omega alkanediol. Mixtures of stabilizers can also be employed. The stabilizer concentration will generally vary from about 0.5 to 5 percent by weight on modified polyester, a preferred range being 1–3%. Polyesters thus stabilized can be thermoformed into films and other useful shapes with essentially no degradation.

The phosphite stabilizers may also be employed in conjunction with hindered phenols such as 2,6-di-t-butyl-4-cresol or sulfide materials such as dilauryl thiodipropionate.

Although the modified polyester products generally have better processability, flexibility and impact properties compared to the starting polyester, further improvements can be made by addition of plasticizers and/or melting point depressants. Solid, liquid, low molecular weight or polymeric materials may be employed. Representative materials are $C_3$-$C_{10}$ alkyl phthalates and terephthalates, dicyclohexyl phthalate, o- and p-toluenesulfonamide, N-ethyl-o,p-toluenesulfonamide, N-cyclohexyl-p-toluenesulfonamide, triphenyl phosphate, tricresyl phosphate, benzophenone, caprolactam, valerolactam, dibenzyl sebacate, lauramide, butyl phthalyl butyl glycolate, diethylene glycol dibenzoate, hydrogenated terphenyl, polyesters of 1 to 3,000 molecular weight derived from an alkane diol and aliphatic dibasic acid and the like.

The products of this invention can also be formulated with inorganic fillers such as alumina, silica, graphite and glass fiber. Such additives complement any stabilizers and plasticizers that have been formulated with the modified polyester product.

Molecular weight, polymer viscosity and/or polymer branching, can also be increased by employing small amounts of tri- or tetrafunctional reagents. Such materials are commercially available and are employed in conventional urethane compositions. Quantities that may be employed can range from 0.1 to 2% by weight on scrap polyester, higher amounts being employed with increasing molecular weight of polyfunctional reagent. Excessive amounts are undesirable in that insoluble or crosslinked product may result.

The products of the present invention can be improved by introduction of crosslink sites which can be crosslinked by heating in the presence of organic peroxides. Such crosslinking is relatively simple if alkenyl sites are present. However, peroxide decomposition is too rapid at the temperature required for thermoforming the products of this invention. One method to overcome this problem is to incorporate a labile cure site which is stable to the solution upgrading process at ≦ 180° C but which can be thermally crosslinked at temperatures of 200° C and higher without evolution of volatiles. One group which has these properties has the formula:

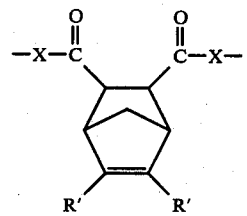

where R' is H or $CH_3$ and both R"s need not be identical and X is —O— or

$R_4$ being selected from alkyl of 1–5 carbon atoms, phenyl and benzyl. This group can be easily incorporated into the products of this invention by employing a derivative of the parent dicarboxylic acid or its anhydride, for example, the bis(hydroxyethyl) ester or by reaction of cyclopentadiene or its mono- or dimethyl derivative with a difunctional reagent containing maleate or maleamide groups.

Still another method to crosslink the polyester is to incorporate, during the upgrading process, small amounts of a cyano function such as that derived from 5-cyanoisophthalic acid, or bis(hydroxyethyl)-5-cyanoisophthalate. Subsequent heating in the presence of an acid or metallic salt catalyst or in the presence of an aromatic dinitriledioxide leads to crosslinking.

The above crosslinking intermediates when employed may be used in amounts of from 0.5 to about 3 weight percent based on starting polyester.

This invention can be further illustrated by the following examples of preferred embodiments, although it will be apparent to those skilled in this art that various changes and modifications may be made therein without departing from the spirit or scope of this invention.

Unless stated otherwise, all solvents were initially anhydrous or pre-azeotroped with benzene or toluene prior to addition of polyester or diisocyanate, reactions were conducted under dry nitrogen atmosphere. Poly(ethylene terephthalate) was powdered and had a relative viscosity of 1.53–1.57 and was predried at 175°–190° C under high vacuum, and had a melting point of 267° C. All relative viscosities were determined in m-cresol at 31° C at a concentration of 1g/100 ml. Melting points were determined via a capillary method.

EXAMPLE 1

Procedure 2

Poly(ethylene terephthalate) powder (29 g) was added with stirring, to a solution (130° C) of sulfolane (150 ml), toluene (70 ml) and hydroxyl terminated poly(tetramethylene ether) (4.5 g, 4.3 mmol). The mixture was gradually heated to 170° C while distilling off toluene. To the polyester solution was added dimeryl diisocyanate, (36 carbon cycloalkylene diisocyanate DDI 1410, General Mills Chemical Company) (3.6 g, 6.0 mmol). The reaction mixture was kept for 2 hours at 170° ± 2° C and then for 1 hour at 180° C. The mixture was allowed to cool to 70° C at which time the precipitated mass was broken up and stirred well with methanol (250 ml). The polymer was filtered, washed well with methanol, and ultimately dried under high vacuum for 2 hours at 170°–180° C. Thirty-five and one-half grams of product was recovered. The product showed significant softening at 250° C, melted at 255° C and had a relative viscosity of 2.0.

When the above experiment was repeated without the poly(tetramethylene ether) and using 0.90 g (1.5 mmol) dimeryl diisocyanate, 29.3 g product of relative viscosity 1.81 was obtained. When 4,4'-methylene dianiline (0.40 g, 2.0 mmol) was prereacted with polyester and poly(tetramethylene ether) as above and subsequently reacted with dimeryl diisocyanate (8.0 mmol) a product of relative viscosity 1.86 was obtained.

EXAMPLE 2

Procedure 3

A stirred solution of sulfolane (300 ml), toluene (75 ml), and hydroxyl terminated poly(tetramethylene ether) (6.0 g, 6.0 mmol) was heated under nitrogen to 130° C while distilling off toluene. Poly(ethylene terephthalate) powder (58 g) was added and the mixture heated to 175° C and then maintained for 3¾ hours. An aliquot showed the polyester to have a relative viscosity of 1.45. Anhydrous zinc acetate (0.1 g) and 4,4'-dicyclohexylmethane diisocyanate (2.36 g, 9.0 mmol) were added and the resulting solution was then maintained for 3 hours at 175° C. The reaction mixture was then cooled, stirred with methanol (700 ml) and filtered. The polymer was twice washed well with methanol and vacuum dried at 175°–185° C. Sixty-two grams of product of relative viscosity 1.80 was recovered.

EXAMPLE 3

Procedure 1

A solution of sulfolane (175 ml), benzene (50 ml) and hydroxyl terminated poly(tetramethylene ether) (16.5 g, 8.09 mmol) was azetroped and, at 110° C, 4,4'-dicyclohexylmethane diisocyanate (2.51 g, 9.59 mmol) and dibutyltin dilaurate (35 mg) added. The solution was stirred for 1 hour at 110° C, then poly(ethylene terephthalate) (33 g) was added and heating continued for 1.5 hours more at 160° C. Hot xylene (150 ml) was added and the reaction mixture was stirred well with methanol. The reaction mixture was filtered and the solid product was washed well with methanol and then high vacuum dried to afford 39.5 g of solid product which completely melted at 255° C and had a relative viscosity of 2.17. Percent nitrogen found was 0.50 (calculated, 0.52). Extraction of the polymer with methanol, tetrahydrofuran or benzene led to essentially no change in nitrogen analysis.

EXAMPLE 4

Procedure 1

An isocyanate terminated poly(butadiene-styrene) (75/25) was prepared by reacting the following for 20 hours at 25° C: 4,4'-dicyclohexylmethane diisocyanate (4.07 g, 15.5 mmol) and a hydroxyl terminated poly(butadiene-styrene) (24.8 g, 16.1 meq OH). The reaction was carried out in nitrobenzene (50 ml) containing dibutyltin dilaurate (0.06 g) catalyst. The resulting solution was added under nitrogen to a hot (175° C) stirred solution of poly(ethylene terephthalate) (163 g) (chopped Mylar film, about ¼ inch square) in dry nitrobenzene (750 ml) which had previously been azeotroped with benzene (100 ml). The reaction mixture was heated for 2 hours at 168°–170° C and then diluted with hot (100° C) xylene (300 ml). Upon cooling to 100° C the mixture was stirred with isopropyl alcohol (500 ml) and methanol (500 ml) and filtered to remove solid polymer which was further washed well with methanol-toluene (1v/1v). The polymer was dried at 170°–180° C under high vacuum to afford 184 g of product which softened at 250° C and showed significant melting at 255° C and had a relative viscosity of 1.90. The product was compounded with triphenylphosphite (2%) and hot pressed (4 minutes at 420° F) to afford tough flexible films.

EXAMPLE 5

Procedure 3

Poly(ethylene terephthalate) (33 g) was added to a hot (135° C) solution of N-methylpyrrolidinone (150 ml), hydroxyl terminated poly(tetramethylene ether) (16.5 g, 8.1 mmol) and benzene (50 ml, added initially). The solution was heated for 2 hours at 167° C. An aliquot of polymer was removed and the relative viscosity was determined as 1.50. Then to the reaction solution there were added 4,4'-dicyclohexylmethane diisocyanate (2.50 g, 9.6 mmol) and dibutyltin dilaurate (35 mg) and heating was continued for 2 hours at 150° C. The product was worked up as described in Example IV whereby 42.5 g of solid polymer product with a relative viscosity of 1.82 was obtained.

EXAMPLE 6

Procedure 1

A stirred solution of sulfolane (150 ml) and toluene (70 ml) was heated to 140° C while distilling off toluene. Poly(ethylene terephthalate) (29 g) was added and the distillation of toluene continued until the solution temperature was 160° C. The temperature was lowered to 150° C whereupon a solution of Multrathane F-242 (trademark of Mobay Chemical Company) (1.91 g, 3.0 meq-NCO; a 4,4'-diphenylmethane diisocyanate terminated polyester) in toluene (10 ml) was added. A moderately viscous solution resulted upon heating for 2 hours at 150° C. The polymer (28.5 g) was isolated in the manner described in Example 1. The polymer melted at 255° C and had a relative viscosity of 2.17.

EXAMPLE 7

Procedure 1

An isocyanate terminated polycaprolactone was prepared by reacting for 20 hours at 25° C, 4,4'-dicyclohexylmethane diisocyanate (1.29 g, 4.88 mmol) with a hydroxyl terminated polycaprolactone (6.6 g, 3.35 mmol) in sulfolane (20 ml) and benzene (10 ml) containing dibutyltin dilaurate (12 mg). This solution was added to a hot (170° C) solution of poly(ethylene terephthalate) (33 g) in sulfolane (150 ml) and benzene (initially 50 ml). The reaction mixture was heated for 1.5 hours at 170° C and the product was isolated as described in Example 2. The polymer (38.4 g) showed some softening at 250° C and a little melting at 255° C and had a relative viscosity of 2.01. Percent nitrogen found was 0.33 (calculated, 0.34). Extraction of the polymer with benzene, acetone, tetrahydrofuran or chloroform led to essentially no change in nitrogen analysis. When the above polyester, reactant polyesters varied in average molecular weight from 10,000 to 30,000.

| EXAMPLE | PROCEDURE FOLLOWED (SOLVENT)[a] | POLY-[Polyester Reactant, 0.010 mol.] (mol. wgt. × 10⁻⁴) | BIFUNCTIONAL[b] REAGENT(S) (mol. wgt. × 10⁻³) (mols. × 10²) | DIISOCYANATE[c] | % VISCOSITY[d] INCREASE |
|---|---|---|---|---|---|
| 8. | 2 (S) | -(1,4-butylene terephthalate) (2.2) | (OH) polycaprolactone (2.0) (1.1) | 4,4'-dicyclohexyl-methane | 52 |
| 9. | 1 (NMP) | -(1,4-butylene terephthalate) (2.2) | None | 2,4-diisocyanato-toluene terminated poly(tetramethylene ether)[e] | 47 |
| 10. | 2 (NB) | -[ethylene terephthalate (20)-co-2,6-naphthalene dicarboxylate (80)] (2.4) | (OH) polyethylene oxide (1.5) (2.4) | 4,4'-diphenylmethane | 42 |
| 11. | 1 (NB/S, lv/lv) | -(ethylene terephthalate) (2.0) | (OH) poly[ethylene adipate (50)-co-isophtalate (50)] (3.6) (0.83) | isophorone | 53 |
| 12. | 1 (NMP) | -[1,4-butylene (75)-co-polytetramethylene[f] (25) terephthalate] (2.6) | (OH)[g] poly[2,2-propane bis(4-phenyl)carbonate] (10.0) (0.26) | 3,3'-dimethoxy-4,4'-diphenyl-methane | 27 |
| 13. | 1 (S) | -[1,5-pentylene carbonyl-4,4'-dibenzoate (80)-co-adipate(20)] (1.5) | (COOH)[h] poly[butadiene(85)-co-acrylonitrile(15)] (3.2) (0.94) | 4,4'-dicyclohexyl-methane | 55 |
| 14. | 3 (NMP/S, lv/lv) | -(1,4-cyclohexane dimethylene iso-phthalate) (1.8) | (NH₂) poly(hexamethylene sebacamide) (6.0) (0.30) | 4,4'-dicyclohexyl-methane | 33 |
| 15. | 3 (S) | -[1,3-propylene 4,4'-dibenzoate(95)-co-fumarate(5)] (1.0) | (OH)[g] poly(4,4'-thio-diphenylene iso-phthalate) (10.0) (0.10) | 1,5-naphthalene | 71 |
| 16. | 3[j] (NB) | -(1,4-butylene terephthalate) (3.0) | (OH) poly[1,4-butylene adipate(90)-co-R[i] (10)] (5.0) (0.90), +11-aminodecanoic acid[j] (0.187) (0.8) | 2,2,4-trimethylhexa-methylene | 22 |
| 17. | 2 (NB/S, lv/lv) | -(ethylene oxybenzoate) (2.0) | (OH) poly(ester-amide)[k] (8.0) (0.25) | 4,4'-dicyclohexyl-methane | 29 |
| 18. | 3[j] (NB/S, lv/lv) | -(ethylene terephthalate) (2.4) (0.005 mol.) +-(1,4-butylene terephthalate) (2.4) (0.005 mol.) | N-methylethanolamine[j] (0.075) (3.2) +bis(hydroxyethyl)-5-cyano-isophthalate (0.279) (2.6) | 3,3'-dimethyl-4,4'-biphenylene | 36 |

[a]Solvents are as follows: NB = nitrobenzene, NMP = N-methylpyrrolidinone, S = sulfolane;
[b]Chemical group indicated in parentheses represents terminal functionality of polymer;
[c]Mols. employed equals the sum of mols. of polyester(s) and difunctional reagent(s) unless specified otherwise;
[d]Of upgraded product compared to polyester reactant;
[e]Weight percent NCO is 4.1;
[f]Molecular weight of poly(tetramethylene ether) segment is 1000;
[g]Terminated as $-O(CH_2)_4-OH$;
[h]Difunctional reagent and diisocyanate prereacted in sulfolane for five hours at 150° C. using dibutyl tin dilaurate as catalyst;

[i]R derived from the dibasic acid of formula 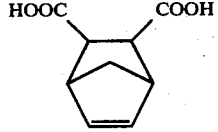

[j]Procedure: Prereact with polyester reactant four hours at 150° C. prior to addition of other difunctional reagent and diisocyanate;
[k]Prepared by the reaction of N,N'-bis(m-hydroxyphenyl) isophthalamide and isophthaloyl chloride (excess) then terminating with excess ethylene glycol.

polycaprolactone, and diisocyanate were blended in the same ratio and heated under nitrogen at 225° C (3 hours) or 240°–245° C (1¾ hours) with stirring, essentially no upgrading occurred.

Unless indicated otherwise the polymers of Examples 8–18 were prepared by reacting the indicated polyester, difunctional reagent(s) diisocyanate under the specified conditions shown below. Yields of product exceeded 75% and relative viscosities varied from 1.8 to 2.8. The Table 2 shows representative data concerning the effect of additives on film properties and polymer viscosity when the polymers of this invention were thermoformed into films at press temperatures of 420° to 440° F.

Poly(ethylene terephthalate) powder which had been upgraded to a relative viscosity of 1.9 by hi-vacuum heating was formulated with 2 percent triphenyl phosphite and thermoformed at 460° F for four minutes. Brittle, unusable films resulted.

Table 2
EFFECT OF ADDITIVE ON FILM PROPERTIES OF POLYMERS

| Additive (Wgt. %)[a] | Plasti-cizer[b] (15%) | Press Temp. (° F) (4 min) | Film Properties | Film[c] Viscosity |
|---|---|---|---|---|
| (Polymer of Example 3) | | | | |
| — | — | 440 | very brittle | 1.59 |
| TPP(2) | — | 440 | tough, flexible | 1.96 |
| — | DBT | 420 | broken, brittle | 1.68 |
| TPP(2) | DBT | 420 | tough, very flexible | 1.92 |
| Bu$_2$Sn(Laurate)$_2$(2) | DBT | 420 | broken, brittle | — |
| Santowhite(2) | DBT | 420 | broken, brittle | — |
| Colloidal Silica(3) | DBT | 420 | broken, brittle | — |
| TPP(2) + Hytrel(11) | — | 420 or 440 | flexible, very heterogeneous | — |
| (Polymer of Example 7) | | | | |
| TPP(0.5) | — | 440 | tough, flexible | 1.78 |
| TPP(2) | — | 440 | tough, very flexible | 1.92 |
| TPP(5) | — | 420 | broken, brittle | 1.52 |
| TPP(2) | DBT | 420 | tough, very flexible | 1.90 |
| — | DBT | 420 | slightly flexible | 1.70 |
| Colloidal Al$_2$O$_3$(3) | — | 440 | very brittle | 1.54 |

[a]TPP = triphenylphosphite; Santowhite = 4,4'-thiobis(6-t-butyl-m-cresol); Hytrel = [poly(1,4-butylene-co-polytetramethylene ether terephthalate)].
[b]DBT = di(n-butyl)terephthalate.
[c]Initial viscosities of uncompounded polymers of Examples 3 and 7 were 2.17 and 2.0, respectively.

It will be seen that a process has been provided for upgrading polyester material exhibiting a relative viscosity of about 1.5 to a product exhibiting a relative viscosity of at least 1.8 as measured in m-cresol at 31° C.

The initial polyester materials to which the process is applicable are those which have been prepared by esterification or transesterification of at least one dicarboxcyclic acid or alkyl or hydroxyalkyl ester thereof with at least one glycol, in known manner.

A broad range of diisocyanates are suitable in carrying out the described procedures, these being represented by the general formula R(NCO)$_2$ in which R represents a divalent organic radical selected from the group consisting of alkylene, cycloalkylene, alkenylene, cycloalkenylene, arylalkylene, arylene and biarylene, as described in the foregoing specification and examples.

Preferably the polyester is one prepared from terephthalic acid or an ester thereof and the diisocyanate is 4,4'-dicyclohexylmethane diisocyanate.

The upgraded product resulting from the processes of the present invention is both physically and chemically distinct from the polyester starting material since the isocyanate (as urethane, amide and/or urea links) and the difunctional reagent are chemically incorporated into the upgraded product, as is evident from the nitrogen analyses of the product (given in Examples 3 and 7) and from the observation that exposure of the upgraded product to the action of non-solvents for the polyester raw material, such as acetone, methanol, benzene, chloroform, or tetrahydrofuran, which are solvents for the diisocyanate and difunctional reagent, does not result in compositional changes as a result of extraction of portions of said product by action of said solvents.

Both the softening and the melting points of the starting material (polyester) are lower than those of the upgraded material.

It is not intended that the invention be limited to the specific polyesters, diisocyanates or difunctional reagents described above, since the invention is broadly applicable to the upgrading of polyesters of at least 10,000 molecular weight and represented by any of the following general repeating units

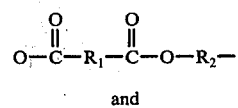

and

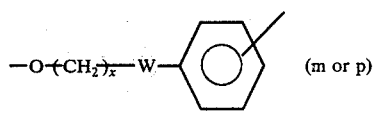

and R$_1$ represents a divalent radical selected from the group consisting of alkylene and alkenylene of 2 to 12 carbon atoms, cycloalkylene and cycloalkenylene of 6 to 36 carbon atoms, phenylene, naphthylene, biarylenes of the formula

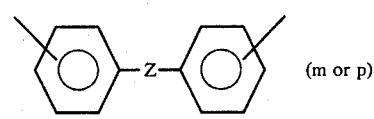

in which Z is selected from the group consisting of a covalent —CH$_2$—

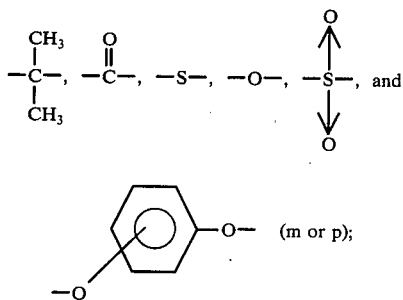

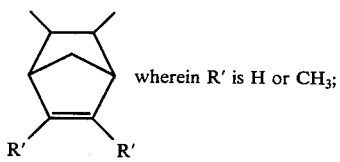
(m or p);

and all said arylene radicals may be substituted with Cl, Br, CH$_3$, CN or alkoxy of 1 to 4 carbon atoms, arylalkylene of 7 CHC$_6$H$_4$; and to 14 carbon atoms, and radicals represented by the formulae $-(CH_2)_y-W$ $-(CH_2)_y$; $-C_6H_4CH=CHC_6H_4-$; and

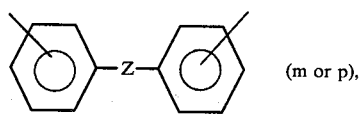
wherein R' is H or CH$_3$;

and R$_2$ represents a divalent radical selected from the group consisting of alkylene of 2 to 12 carbon atoms, alkenylene of 4 to 12 carbon atoms, cycloalkylene and cycloalkenylene of 6 to 36 carbon atoms, phenylene, naphthylene, biarylenes of the formula

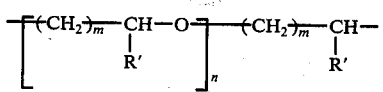
(m or p), arylalkylene of 7 to 14 carbon atoms, $-(CH_2)_y-$ W ($CH_2)_y$, and polyalkylene oxides represented by the formula

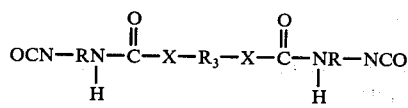

wherein R' is H or CH$_3$; n is an integer of 2 to 200, m is 1, 2 or 3, y is either 1 or 2 and W is selected from the group consisting of —O— and —S—, and x is an integer from 2 to 6.

Such polyesters can be reacted with diisocyanates represented by the general formulae R(NCO)$_2$ and $$OCN-RN-\underset{H}{\overset{O}{\overset{\|}{C}}}-X-R_3-X-\overset{O}{\overset{\|}{C}}-\underset{H}{NR}-NCO$$

(the adduct of a diisocyanate and a difunctional compound) and with difunctional compounds represented by the general formula HX—R$_3$—XH wherein R represents a divalent radical selected from the group consisting of alkylene of 5 to 12 carbon atoms, alkenylene of 2 to 12 carbon atoms, cycloalkylene and cycloalkenylene of 6 to 36 carbon atoms, phenylene, naphthylene, biarylenes represented by the formula

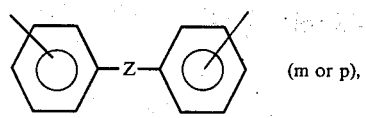
(m or p), and all said arylene radicals substituted with Cl, Br, CH$_3$, or alkoxy of 1 to 4 carbon atoms, bicycloalkylene radicals represented by the formula

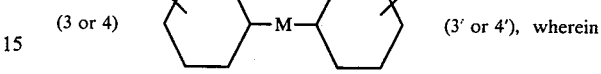

wherein M is a covalent bond or —CH$_2$—, poly(butadiene-caprolactam) (block), poly(styrene-caprolactam) (block); and R$_3$ represents a divalent radical selected from the group consisting of R$_2$ as defined above,

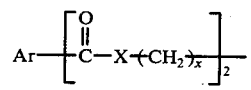

where Ar is a divalent cyano substituted arylene as defined for R$_1$,

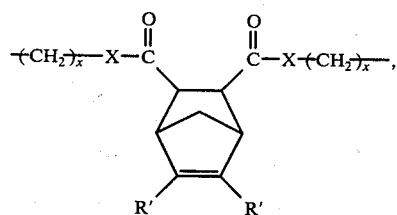

polyester, polyamide, poly(ester-amide), polycarbonate, poly(ester-carbonate), polysiloxane, and polymers derived from at least one of the following monomers, butadiene, isoprene, styrene, α-methylstyrene, acrylonitrile, C$_1$-C$_4$ alkyl esters of acrylic or methacrylic acid, wherein the polymeric R$_3$ radicals vary in molecular weight from 300 to 10,000; and wherein X is selected from the group consisting of —O— and —NR$_4$ where R$_4$ represents H, C$_1$-C$_5$ alkyl, benzyl or phenyl; wherein all the R's, R$_1$'s, R$_2$'s, R$_3$'s, R$_4$'s, R"'s, m's, x's, X's and Z's need not be identical and with the following proviso that when X is equal to oxygen it is not bonded to an aromatic carbon atom and at least 50 percent of the R$_1$ groups are arylene.

I claim:

1. A process for preparing a polyester in powder form by upgrading the molecular weight of an aromatic polyester or a mixture of aromatic polyesters with an initial molecular weight of about 10,000 to a product possessing a relative viscosity of at least 1.8 as measured in m-cresol at 31° C. which comprises: reacting said polyester with at least one reagent selected from the group consisting of (1) diisocyanates represented by the formula R(NCO)$_2$ and at least one difunctional compound in which the functionality is selected from the group consisting of —OH, —NH, —COOH and mixtures thereof; and (2) the reaction products of said diisocyanate and said difunctional compound alone or with at least one other difunctional compound; effecting said reaction in a polar aprotic solvent at temperatures of 100°–180° C., the relative proportions of the reactants being such that the total number of equivalents of isocyanate groups is substantially equal to the total number of equivalents of —OH, —NH, and/or —COOH reactive sites present in the polyester and difunctional compounds, the difunctional compound being present in the amount of 1 to 50 percent by weight based on the weight of said polyester, and R represents a divalent number selected from the group consisting of alkylene, cycloalkylene, alkenylene, cycloalkenylene, arylalkylene, arylene, biarylene, and all the R groups are not required to be the same and thereafter removing said solvent.

2. The process of claim 1 wherein the polar aprotic solvent is selected from the group consisting of sulfolane, 3-methyl sulfolane, N-methylpyrrolidone, nitrobenzene, nitrotoluene, dimethyl sulfoxide, trimethylene sulfone, and mixtures thereof.

3. The process of claim 2 wherein the solvent is sulfolane.

4. The process of claim 2 wherein the solvent is N-methylpyrrolidinone.

5. The process of claim 1 wherein the diisocyanate and the difunctional compound are reacted with one another, prior to reaction with the polyester resin.

6. The process of claim 1 in which the diisocyanate is added to a solution of said polyester and said difunctional compound.

7. The process of claim 6 which includes in addition heating the solution of polyester and difunctional compound at 100°–180° C for a period of 0.5–10 hours prior to addition of diisocyanate.

8. Upgraded polyester polymers produced by the process of claim 1.

9. The polymers of claim 8 wherein the polyester to be upgraded has been prepared from terephthalic acid or an ester thereof.

10. The polymers of claim 9 wherein the polyester to be upgraded is poly(ethylene terephthalate).

11. The polymers of claim 9 in which the polyester to be upgraded is poly(butylene terephthalate).

12. Upgraded polymers produced by the process of claim 1 in which the diisocyanate is 4,4'-dicyclohexylmethane diisocyanate.

13. Upgraded polymers produced by the process of claim 1 in which the difunctional reagent is a hydroxyl terminated polyester of molecular weight 500 to 6000 and comprises 5 to 25 percent by weight on polyester resin.

14. Upgraded polymers produced by the process of claim 1 in which the difunctional reagent is selected from a hydroxyl or carboxy terminated polymer derived from butadiene, acrylonitrile, styrene or mixtures thereof and has a molecular weight 500 to 6000 and comprises 5 to 25 percent by weight on polyester resin.

15. The upgraded polymers produced by the process of claim 1 and which have been stabilized with 0.5 to 5 percent of an organic phosphite.

16. Upgraded polymers produced by the process of claim 1 in which the difunctional reagent is a hydroxyl terminated polyether of molecular weight 500 to 6000 and comprises 5 to 25% by weight on polyester resin.

* * * * *